US012574589B2

(12) United States Patent
Sodagar

(10) Patent No.: US 12,574,589 B2
(45) Date of Patent: Mar. 10, 2026

(54) SIGNALING FOR PICTURE IN PICTURE IN MEDIA CONTAINER FILE AND IN STREAMING MANIFEST

(71) Applicant: TENCENT AMERICA LLC, Palo Alto, CA (US)

(72) Inventor: Iraj Sodagar, Los Angeles, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/341,471

(22) Filed: Jun. 26, 2023

(65) Prior Publication Data

US 2024/0022786 A1 Jan. 18, 2024

Related U.S. Application Data

(60) Provisional application No. 63/417,103, filed on Oct. 18, 2022, provisional application No. 63/388,555, filed on Jul. 12, 2022.

(51) Int. Cl.
*H04N 21/434* (2011.01)
*H04N 21/4385* (2011.01)

(52) U.S. Cl.
CPC .............................. *H04N 21/4347* (2013.01)

(58) Field of Classification Search
CPC ......... H04N 21/4347; H04N 21/43856; H04N 21/85406; H04N 21/235; H04N 21/2353;
(Continued)

(56) References Cited

U.S. PATENT DOCUMENTS 11,765,407 B2 9/2023 Denoual et al.
2015/0304665 A1 10/2015 Hannuksela et al.
(Continued)

FOREIGN PATENT DOCUMENTS

JP 2008-22568 A 1/2008
JP 2016-7015 A 1/2016
JP 2021-528891 A 10/2021

OTHER PUBLICATIONS

"Text of ISO/IEC DIS 14496-12 8th edition ISOB Base Media File Format"; ISO/IEC JTC 1/SC 29/WG 03, N0651; MPEG Systems; Convenorship: KATS (Korea, Republic of); Serial Number 21780; Sep. 19, 2022; 2 pages.

(Continued)

*Primary Examiner* — Rong Le
(74) *Attorney, Agent, or Firm* — Crowell & Moring LLP

(57) ABSTRACT

This disclosure relates to signaling of picture-in-picture (PiP) in media container files and in streaming media manifest. In one aspect, signaling of PiP experience in container files are disclosed, where the PiP experience consists of two or more media tracks. A media track group is used to define a picture-in-picture experience, wherein the main media track or tracks and the substitute/overlay media tracks are defined. The PiP experience is identified with a Role scheme. The media tracks in the PiP can be decoded independently, or if the coding scheme supports, the substitute coded stream can replace the corresponding regions in the main picture stream in a merge mode, for which an order of importance of the substitute picture and the specific regions of the main picture are also signaled. In another aspect, a picture-in-picture experience may be signaled in streaming manifest. Such signaling may include identifying the adaptation sets with a picture-in-picture descriptor as well as using a role descriptor to identify the PiP experience, and further annotating the subpicture in a manifest where one or more subpictures are identified as one or more regions for substitutions.

20 Claims, 8 Drawing Sheets

(58) Field of Classification Search
CPC ......... H04N 21/2389; H04N 21/26258; H04N 21/84; H04N 21/8456
See application file for complete search history.

(56) References Cited

U.S. PATENT DOCUMENTS

| | | | |
|---|---|---|---|
| 2017/0171576 A1* | 6/2017 | Oh | ....................... H04N 21/236 |
| 2019/0014165 A1 | 1/2019 | Stockhammer et al. | |
| 2022/0167042 A1* | 5/2022 | Hannuksela | ..... H04N 21/26258 |
| 2024/0284000 A1* | 8/2024 | Schreiner | ......... H04N 21/44008 |

OTHER PUBLICATIONS

"Information technology—Coding of audio-visual objects—Part 12: ISO base media file format"; ISO/IEC JTC 1/SC 29 N; DIS 14496-12z202x (E); ISO/IEC JTC 1/SC 29/WG 11; Secretaritat: JISC; Sep. 2022; 327 pages.

International Search Report on PCT application PCT/US23/26614 dated Oct. 2, 2023, 3 pages.
Extended European Search Report issued in European Application No. 23840136.8 dated Aug. 22, 2025 (11 pages).
"Technologies under Consideration for Dynamic Adaptive Streaming over HTTP 23009, Parts 1, 3, 4, 5, 6 and 8", ISO/IEC JTC 1/SC 29/WG 03, MPEG Systems, Jul. 23, 2021, pp. 1-114, XP093272489 (114 pages).
Wang, Ye-Kui; "[27.4][DASH] On picture-in-picture support in DASH", International Organisation for Standardisation Organisation Internationale De Normalisation ISO/IEC JTC 1/SC 29/WG 3 Coding of Moving Pictures and Audio, Apr. 2022, XP030330724 (4 pages).
Japanese-language Office Action issued in Japanese Application No. 2024-547121 dated Sep. 30, 2025 (3 pages).
Chernock, Richard et al.; "Next-Generation Broadcast Television: ATSC 3.0", IEEE Signal Processing Magazine, Jan. 2016, pp. 158-162, vol. 33 (6 pages).

* cited by examiner

100

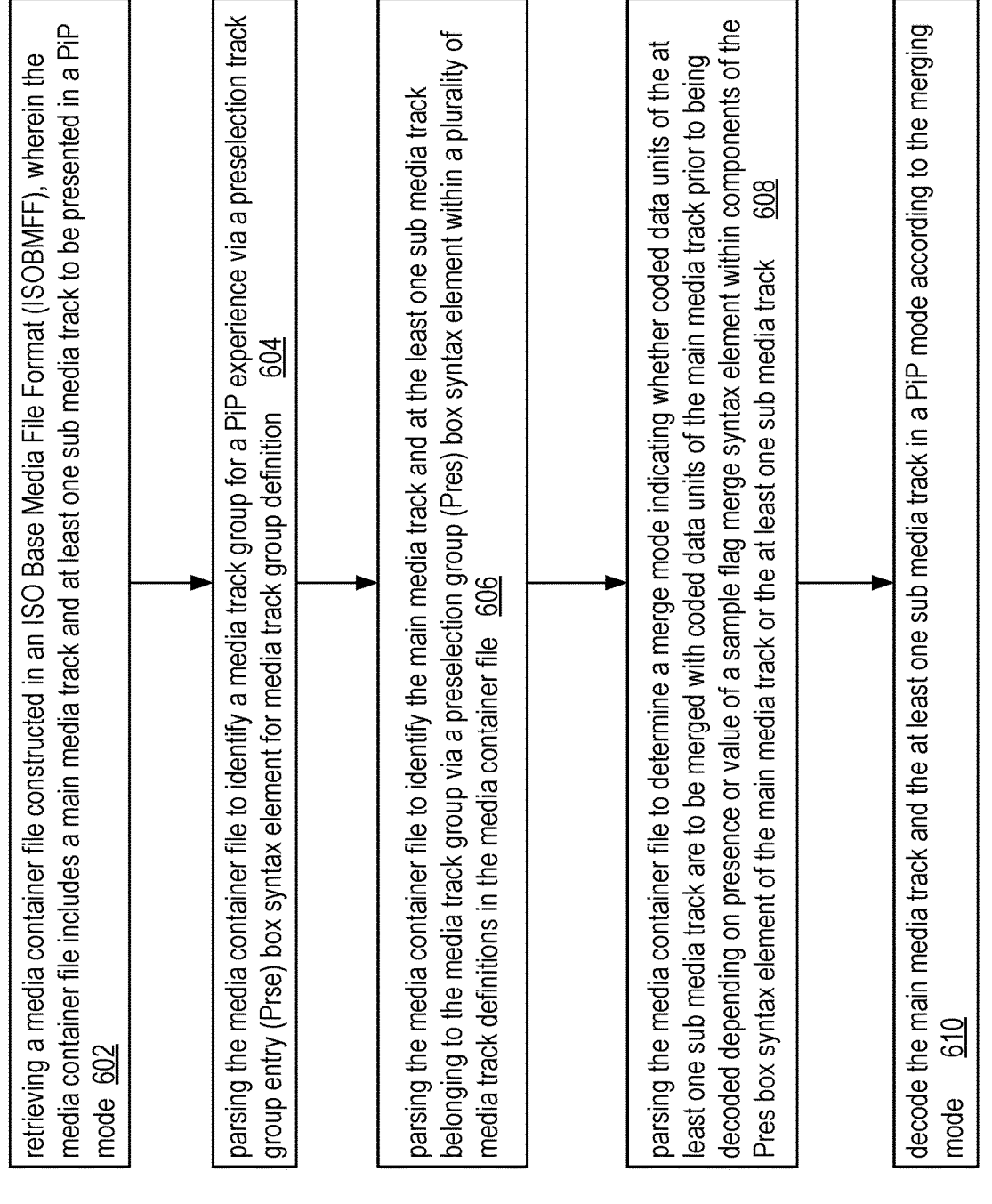

retrieving a media container file constructed in an ISO Base Media File Format (ISOBMFF), wherein the media container file includes a main media track and at least one sub media track to be presented in a PiP mode  602 parsing the media container file to identify a media track group for a PiP experience via a preselection track group entry (Prse) box syntax element for media track group definition  604 parsing the media container file to identify the main media track and at the least one sub media track belonging to the media track group via a preselection group (Pres) box syntax element within a plurality of media track definitions in the media container file  606 parsing the media container file to determine a merge mode indicating whether coded data units of the at least one sub media track are to be merged with coded data units of the main media track prior to being decoded depending on presence or value of a sample flag merge syntax element within components of the Pres box syntax element of the main media track or the at least one sub media track  608 decode the main media track and the at least one sub media track in a PiP mode according to the merging mode  610

*FIG. 6*

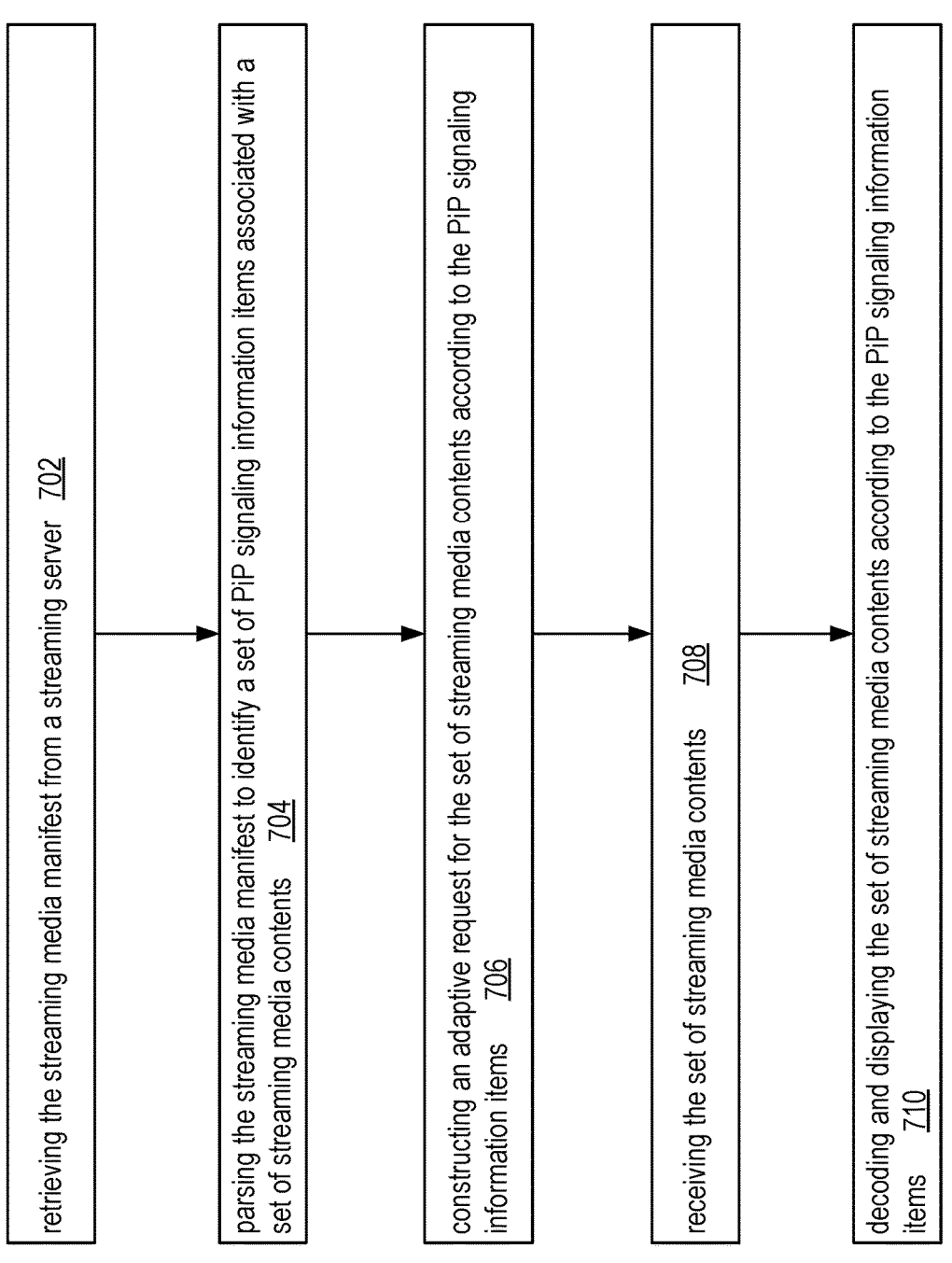

*FIG. 7* retrieving the streaming media manifest from a streaming server  702 parsing the streaming media manifest to identify a set of PiP signaling information items associated with a set of streaming media contents  704 constructing an adaptive request for the set of streaming media contents according to the PiP signaling information items  706 receiving the set of streaming media contents  708 decoding and displaying the set of streaming media contents according to the PiP signaling information items  710

SIGNALING FOR PICTURE IN PICTURE IN MEDIA CONTAINER FILE AND IN STREAMING MANIFEST

INCORPORATION BY REFERENCE

This application is based on and claims the benefit of priority to U.S. Provisional Application No. 63/388,555 filed on Jul. 12, 2022, and U.S. Provisional Application No. 63/417,103 filed on Oct. 18, 2022, which are herein incorporated by reference in their entireties.

TECHNICAL FIELD

This disclosure relates to signaling of picture-in-picture (PiP) in media container files and in streaming media manifests.

BACKGROUND

Media contents may be organized in a container file having a predetermined format. Such media contents may include visual information such as images or videos. Different set of visual information may be displayed simultaneously in, for example, a picture-in-picture (PiP) mode. The media container files may be downloaded for local playback or may be streamed from a server. Both downloaded or streaming media may invoke PiP mode. Information and configuration related to media contents for PiP usage may need to be signaled in the media container file or bitstream, and in media manifests used by streaming application to perform adaptive streaming.

SUMMARY

This disclosure relates to signaling of picture-in-picture (PiP) in media container files and in streaming media manifest.

In one aspect, signaling of PiP experience in container files are disclosed, where the PiP experience consists of two or more media tracks. A media track group is used to define a picture-in-picture experience, wherein the main media track or tracks and the substitute/overlay media tracks are defined. The PiP experience is identified with a Role scheme. The media tracks in the PiP can be decoded independently, or if the coding scheme supports, the substitute coded stream can replace the corresponding regions in the main picture stream in a merge mode, for which an order of importance of the substitute picture and the specific regions of the main picture are also signaled.

In another aspect, a picture-in-picture experience may be signaled in streaming manifest. Such signaling may include identifying the adaptation sets with a picture-in-picture descriptor as well as using a role descriptor to identify the PiP experience, and further annotating the subpicture in a manifest where one or more subpictures are identified as one or more regions for substitutions.

In some example implementations, a method to obtain (Picture-in-Picture) PiP information is disclosed. The method may include retrieving a media container file constructed in an ISO Base Media File Format (ISOBMFF), wherein the media container file includes a main media track and at least one sub media track to be presented in a PiP mode; parsing the media container file to identify a media track group for a PiP experience via a preselection track group entry (Prse) box syntax element for media track group definition; parsing the media container file to identify the main media track and at least one sub media track belonging to the media track group via a preselection group (Pres) box syntax element within a plurality of media track definitions in the media container file; parsing the media container file to determine a merge mode indicating whether coded data units of the at least one sub media track are to be merged with coded data units of the main media track prior to being decoded depending on presence or value of a sample flag merge syntax element within components of the Pres syntax box element of the main media track or the at least one sub media track; and decoding the main media track and the at least one sub media track in the PiP mode according to the merging mode.

In the example implementation above, the Prse box syntax element belongs to a first predefined type of syntax elements in the media container file configured to define media track groups.

In any one of the example implementations above, the first predefined type of syntax element each includes a media track group type tag element; and the media track group type tag element indicates an intended experience of the corresponding media track group, including the PiP experience, using a set of predefined purpose keywords.

In any one of the example implementations above, the first predefined type of syntax elements each includes a media track group type descriptor; and the media track group type descriptor is configured to specify an intended experience of the corresponding media track group, including the PiP experience, using a role scheme with predefined roles.

In any one of the example implementations above, each of the first predefined type of syntax elements in the media container file include a number of tracks of the corresponding media track group.

In any one of the example implementations above, the Pres box syntax element belongs to a second predefined type of syntax elements within a definition of a media track configured to specify an association of the media track with a media track group using a corresponding media track group identifier.

In any one of the example implementations above, each of the second predefined type of syntax elements comprises a media track group processing descriptor (prsp) for specifying PiP processing of the media track with respect to the media track group.

In any one of the example implementations above, the media track group processing descriptor comprises a priority parameter to indicated a priority order of the media track relative to other media tracks in the media track group.

In any one of the example implementations above, the priority parameter of the main media track of the PiP experience comprises a highest priority value for PiP processing.

In any one of the example implementations above, the priority parameter of the at least one sub media track of the PiP experience comprises a lower priority value for PIP processing.

In any one of the example implementations above, the sample flag merge syntax element belongs to a third predefined type of syntax elements which are correspondingly included in the media track group processing descriptor associated with main media tracks.

In any one of the example implementations above, the third predefined type of syntax element associated with the main media track having a predefined value indicates that the main media track is mergeable with the sub media track prior to being decoded.

In any one of the example implementations above, when the third predefined type of syntax element associated with the main media track is of the predefined value, decoding the main media track and the at least one sub media track in the PiP mode comprises merging the coded data units of the main media track and the coded data units of the at least one sub media track for a single decoding.

In any one of the example implementations above, the media track group processing descriptor comprises a region identification parameter for indicating a list of regions, in coded stream of corresponding media track, that are to be merged with coded stream of other media tracks prior to decoding.

In any one of the example implementations above, when the third predefined type of syntax element associated with the main media track is of the predefined value, the region identification parameter associated with the main media track is non-NULL.

In any one of the example implementations above, when the priority order of the media track is not the highest, the region identification parameter for the media track is ignored even if present.

In any one of the example implementations above, when the region identification parameter for the media track is non-NULL, the priority order of the media track is correspondingly the highest.

In any one of the example implementations above, when the third predefined type of syntax element associated with the main media track is not of the predefined value, decoding the main media track and the at least one sub media track in the PiP mode comprises processing the main media track and the at least one sub media track by separate independent decoding.

In any one of the example implementations above, either the main media track and the at least one sub media track belongs to another media track group as indicated by another Prse box syntax element in the media container file.

In some other example implementations, a method to obtain picture-in-picture (PiP) signaling information from a streaming media manifest is disclosed. The method may include retrieving the streaming media manifest from a streaming server; parsing the streaming media manifest to identify a set of PiP signaling information items associated with a set of streaming media contents; constructing an adaptive request for the set of streaming media contents according to the PiP signaling information items; receiving the set of streaming media contents; and decoding and displaying the set of streaming media contents according to the PiP signaling information items.

In the example implementation above, the PiP signaling information items may be extracted from a plurality of adaptation sets in the streaming media manifest.

In anyone of the example implementations above, the plurality of adaptation sets forms a PiP group.

In anyone of the example implementations above, each of the plurality of adaption sets comprises a supplemental descriptor for specifying a role of the corresponding adaptation set.

In anyone of the example implementations above, the supplemental descriptor comprises a role value and an identifier.

In anyone of the example implementations above, the role value is among a set of role values defined in a predefined role scheme.

In anyone of the example implementations above, the predefined role scheme is indicated in the plurality of adaptation sets using a Universal Resource Name (URN) of the predefined role scheme.

In anyone of the example implementations above, the role value indicates that the corresponding adaptation set is for PiP; and the identifier is the same for the plurality of adaptation sets of the PiP group and is assigned for identifying the PiP group from other adaptation groups including other PiP adaptation groups.

In anyone of the example implementations above, the role value further indicates a role of the corresponding adaptation set in the PiP group or the role comprises one of main adaptation or a sub adaptation among the PiP group.

In anyone of the example implementations above, at most one of the plurality of adaptation sets is associated with the role of a main adaptation set in the PiP group.

In anyone of the example implementations above, when an adaptation set of the plurality of adaptation sets is the main adaptation set and is mergeable by sub adaptation sets in the PiP group, a content component descriptor of the main adaptation set further comprises a list of coded sub-component of the main adaptation set suitable for replacement by coded sub adaptation sets of the PIP group before being decoded.

In anyone of the example implementations above, at least one of the plurality of adaptation sets in the PiP group includes a second supplemental descriptor indicating that the at least one of the plurality of adaptation sets also belongs to a second PiP group.

Aspects of the disclosure also provide a media streaming device or apparatus including a circuitry configured to carry out any one of the method implementations above.

Aspects of the disclosure also provide non-transitory computer-readable mediums storing instructions which when executed by a media streaming device are configure to cause the media streaming device to perform any one of the method implementations above.

BRIEF DESCRIPTION OF THE DRAWINGS

Further features, the nature, and various advantages of the disclosed subject matter will be more apparent from the following detailed description and the accompanying drawings in which:

FIG. 6 shows an example data and logic flow for the signaling scheme of FIG. 5.

FIG. 7 shows an example data and logic flow.

DETAILED DESCRIPTION OF EMBODIMENTS

Streaming Over Hypertext Transfer Protocol (HTTP)

Figure 1:
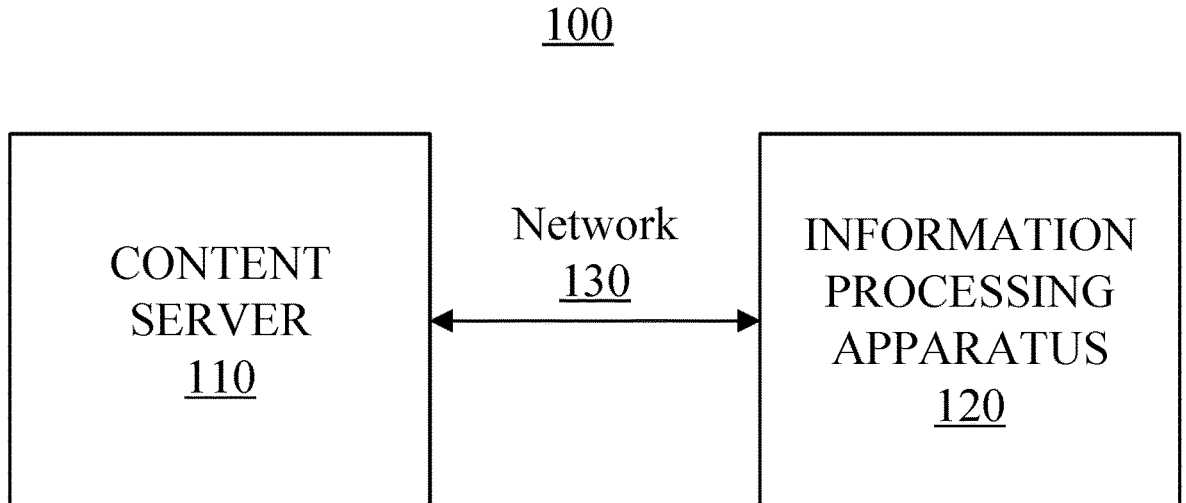
FIG. 1 illustrates a content distribution system according to an embodiment of the present disclosure.

FIG. 1 illustrates an example content distribution system 100, in which a remote information processing apparatus 120 is configured to request contents from one or more centralized or distributed content servers 110 over a communication network 130. In particular, the information processing apparatus 120 may include dedicated hardware components, software components running on general purpose hardware, or the combination thereof, which functions as a content consuming application. The content consuming application may generate one or more requests specifying the contents being requested and the characteristics of the requested contents. Each request may be constructed based on a stack of network protocols, and communicated to the content server 110 over the communication network 130. In response, the content server may generate a bitstream according to the request, package the bitstream using the stack of network protocols and communicate the bitstream packages to the content consuming application.

In some example implementations, the content may be requested at once. In other words, an entirety of a media content may be requested by the content consuming application, received, and stored locally. The locally stored content may be processed and consumed as needed (e.g., extracted, decoded, and played back) by, for example a media player, either being part of or separate from the content consuming application. Such a process may be referred to as downloading.

In some other implementations, the content may be streamed as it is being consumed rather than being downloaded for later consumption. In such implementations, the entirety of the requested content may not need to be stored in the content consuming application. Rather, only a limited amount of content is continuously received from the content server 110 on a rolling basis and managed by an in-and-out local buffer for content processing and playback. Such implementations may be referred to as streaming. While some media playback functions, such as rewinding, fast-forwarding, and seeking may involve complex media bitstream control and buffering, media streaming is usually more versatile and more suitable for distribution of contents containing timed sequences of media that are not repeated consumed.

In the disclosure below, the terms "content" and "media" may be used interchangeably. A requested content may include various information items needed for its consumption, including but not limited to the content itself and various metadata. The content itself, may further include various media components, such as different tracks, including but not limited to video components/tracks, audio components/tracks, subtitles, and the like. Metadata for describing the media content or providing additional processing information may be treated as one or more separate tracks. Such content with its metadata may be generated by the content server 120 as a bitstream that can be parsed and decoded according to a set of protocols or rules known to the content consuming application. The term "content server" in its singular form is used to represent a single server or a plurality of servers arranged in a central location or distributed over various geographical locations. Such content servers may be implemented as dedicated computing machines, or alternatively, may be constructed as virtual machines, and/or as virtually hosed in a cloud computing environment. Further in the disclosure below, the terms "information processing apparatus" (referring to 120 of FIG. 1) and "content consuming application" may be used interchangeably. These terms may also be alternatively referred to as "client," "client devices/apparatus," "playback devices/apparatus/client," and the like. While only a single information processing apparatus 120 is shown in FIG. 1, there can be a plurality of independent information processing apparatus. In other words, a set of content servers 110 may be configured to simultaneously and independently provide streaming service to a plurality of content consuming applications.

In some example implementations, contents generated for distribution by the content server 110 may be segmented to facilitate their streaming. For example, timed sequences of media contents such as movies, may be chopped into time segments, each containing a number of media frames. Each media segment may be self-contained such that its processing including, for example, parsing, decoding, and playback, does not require information for other media segments. The media contents may be pre-segmented. Accordingly, the media contents may be stored and managed by the content server 120 segment by segment. Alternatively, media segments may be generated in real-time from contiguously stored media contents as they are being requested during streaming processes. In some further implementations, the segmentation of the media may be hierarchical, containing multiple levels of segmentation.

In some particular implementations for streaming, decision as to which media segments or which portions of the media segments to request from the content server 110 may be determined by a content consuming application in real time as controlled by user play-back instructions through a user application interface. In such a manner, the content server may be configured to respond to the requests and generate or retrieve segments or portions of segments of the content with their metadata according to the requests, and deliver the segments or portions of the segments to the requesting content consuming application over the network 130.

In some example implementations, a same media track of a media content may be prepared as different versions. For example, the same movie track may be prepared in different resolutions and/or frame rate. For another example, the same movie track may be prepared in different bitrates. For another example, the same audio movie may be prepared with different sound quality and/or different number of sound channels (e.g., 5-channel sound, or 7-channel sound). Accordingly, the content consuming application may determine which version of the media tracks to stream and include such selection in its requests for media content. Such decision by the content consuming application, may be made based on one or more of a number of example factors, including but not limited to the playback capabilities of the information processing apparatus 120 (e.g., display resolution, decoding speed, processing power, buffer size, and the like), the network bandwidth and throughput, and the like. As such, the streaming session may be adapted among different media consuming applications according to their device capabilities. A streaming architecture so configured may be referred to as adaptive streaming. The streaming process may further be adaptive within each media consuming application in that different versions of the media tracks may be selected and requested at different times during a streaming session, according to, for example, a real-time network condition (for example, bandwidth and throughput, and bitrate supported by the network bandwidth). A streaming architecture so configured may be further referred to as dynamic adaptive streaming. In particular, a streaming architecture configured to adapt to bitrates of the media content may be referred to as dynamic adaptive bitrate streaming.

In some example implementations, a request for a particular version of segments or portions of segments of media content by the content consuming application in dynamic adaptive streaming may be constructed based on a media manifest according to the progression of the streaming session. The term "manifest" may be used to represent any collection of information items that describe the media content, including the segmentation, versions, network locations, and any other information that may be needed for any content consuming application to determine how and what to request at different times during a streaming session. A manifest may be generally referred to as a "media presentation description" (MPD).

Such a manifest may be prepared on the content server side at the time when a particular media content is created or generated. Such a manifest may be requested by the content consuming application and received from the content server at the beginning of a streaming session. The content consuming application may further request any update of the manifest during the streaming session. Such manifest may be used by the content consuming device as a blueprint for constructing the subsequent requests of particular version of segments or portions of segments of the media content during the streaming session.

In some example implementations, the media server may be configured to function similarly to a web server from the stand points of external applications. As such, a request for a media manifest and/or for media segments or portions of media segments by a content consuming application may be made based on, for example, the hypertext transfer protocol (HTTP). As such, a request may be constructed as a URL and the requested content may be delivered as a response to the HTTP request from the content server.

Details for the manners in which the manifests are specified, the contents are segmented, organized, and versioned, and the HTTP requests are constructed may depend on specific adaptive streaming protocol, such as Dynamic Adaptive Streaming over HTTP (DASH), HTTP Live Streaming (HLS), Smooth Streaming Transport Protocol (SSTP), and the like. The various additional example implementations below may be described in the context of DASH. However, the underlying principles are applicable to any type of adaptive streaming over HTTP. Further, the underlying principles are applicable to media content request mechanism based on network protocols other than HTTP.

Dynamic Adaptive Streaming Over HTTP (DASH)

One example protocol for implementing adaptive media streaming includes Dynamic Adaptive Streaming over Hypertext transfer protocol (DASH). As described above, DASH represents one of the adaptive bitrate streaming implementations that enables streaming of media content using content delivery networks (CDNs) based on hypertext transfer protocol (HTTP) infrastructures, including content servers configured as web servers with various proxies and caches, and the like. Such content servers may be referred to as DASH servers. The content consuming applications described above may accordingly be referred to as DASH clients.

DASH supports live streaming from a DASH server to a DASH client, and allows the DASH client to control a streaming session, so that the DASH server does not need to cope with an additional load of stream adaptation management in large scale deployments. As described above, DASH also allows the DASH client a choice of streaming from various DASH servers, thereby achieving further load-balancing of the network for the benefit of the DASH client. DASH further provides dynamic switching between different media versions of the media tracks, for example, by varying bitrates to adapt to network conditions and processing capability of a DASH client.

In DASH, the media manifest described above may be particularly referred to as an MPD (even though the term MPD may be generally used to refer to manifest of any type in adaptive streaming systems other than the ones based on DASH). For example, an MPD in DASH may be constructed as a file that is downloadable in full or in part by a DASH client and that provides information items used by the DASH client to stream the media content by selectively and adaptively requesting streaming media segments from the DASH server.

An MPD may be constructed in various formats. For example, an MPD may be constructed in the form of an Extensible Markup Language (XML) document or file. The MPD file may be requested and delivered to the DASH client. The MPD file may be requested by HTTP via, for example, an HTTP GET request. The MPD file may be delivered entirely at the beginning of a streaming session. Alternatively, the MPD file can be fragmented and delivered in parts. As such, parts of the MPD file may be requested and delivered prior to the start of the streaming and other parts of the MPD file may be requested and delivered later to reduce session start-up delay (such that the streaming can begin with the earlier media segments without having to wait for information items pertaining to later segments of the media). The MPD file can also be updated during the streaming session (e.g., with the segment information that is needed but is not yet retrieved).

In some example implementations, the MPD file describes the segmentation of the media content, the organization of the segments, and available versions of the segments. The MPD may support expression of content accessibility features, ratings, camera views, metadata, and the like. DASH may also support delivery of multi-view and scalable coded content.

In some example implementations, an MPD file may contain a sequence of descriptions for one or more periods along a media consumption timeline (e.g., play time of a video content). Each of the one or more periods may be defined by, for example, a "period" information element tag in the MPD file. The media content may be indicated by the MPD file as organized in a plurality of continuous periods in time. The MPD file may identify a start time for each of the periods in the playback timeline. The start time may be defined as an absolute start time from a beginning of the media content or as a relative offset from other reference point in the playback timeline.

In some example implementations, for each media period, the MPD file may further specify one or more adaptations sets. Different adaptation sets may be specified to capture different combinations (or subset) of one or more of the media components. For example, video and audio can be different adaptation sets. Different versions of audios (stereo audio or multi-channel audio) may be different adaptation set. Audio of different language may be different adaptation sets. In one particular example, the MPD file may specify that each period contains one video adaptation set, multiple audio adaptation sets, one for each of the supported languages. Adaptation sets may also contain subtitles or arbitrary metadata.

In some example implementations, adaptation sets of a particular period may be assigned to a group indicated by a group attribute in the MPD file. Adaptation sets in the same group are generally considered alternatives to each other. For example, each adaptation set of video data for a particular period can be assigned to the same group, such that any adaptation set can be selected for video data of the multimedia content for the corresponding period. The media content within one period can be from either one adaptation set, or a combination of adaptation sets, with each group contributing at most one adaptation set.

In some example implementations, each adaptation set may be specified by the MPD file as containing one or more representations for the same media component for the corresponding period. A representation, for example, can be one of a number of alternative encoded versions of audio or video data. The representations can differ by encoding types, e.g., by bitrate, resolution, and/or codec for video data, and bitrate, and/or codec for audio data. The term representation can be used to refer to a section of encoded media data corresponding to a particular period of the multimedia content and encoded in a particular way to achieve a certain range of average bitrate. In some examples implementations, for each representation in an adaptation set, the MPD file may specify attributes of the representation including but not limited to video/audio type, video/audio codecs, video frame width in pixels, video frame height in pixels, video/audio frame rate, and bandwidth (representing average encoded bitrate).

Each representation of an adaptation set may also include one or more media components depending the combination of media components included in the adaptation set. Each media component in a representation may correspond to an encoded version of one individual media type, such as audio, video, or timed text (e.g., for closed captioning). Media components can be time-continuous across boundaries of consecutive media segments within one representation.

In some example implementations, a representation may include one or more segments. Each representation can include an initialization segment, or each segment of a representation can be self-initializing. When present, the initialization segment can contain initialization information for accessing the representation. In some cases, the initialization segment does not contain media data. Segments that contain media data may represent the time-segmented contents. Segments between different representations may be aligned in time. For each media segment, the MPD file may include a unique identifier. Such an identifier, when combined with a basis URL, a base URN, or base uniform resource identifier (URI), may form a unique URL, URN or URI that represents a network location of the media segment, which may be included in an HTTP request for this media segment and be used by the content server to locate the requested segment for delivery.

For example, a URL for requesting a media segment can be defined as an <absolute-URI>, with a fixed scheme of "http" or "https", possibly further supplemented by a byte range if a range attribute is provided together with the URL. The byte range can be expressed to identifying a contiguous range of bytes in the segment.

In some further example implementations, sub-representations may be specified and described in the MPD file as being embedded (or contained) in regular representations using, for example, a Sub-Representation element/indicator. The sub-representation element may be used to describe properties of one or several media content components that are embedded in the representation. For example, the sub-representation element may be used to describe properties of an embedded audio component (e.g., codec, sampling rate, etc.), an embedded sub-title (e.g., codec), or the sub-representation element may be used to describe some embedded lower quality video layer (e.g., some lower frame rate, etc.).

Sub-representation and representation elements can share some common attributes and elements.

In some example implementations, the DASH client may be configured to access, download, and request an entirety or a portion of the MPD file from the DASH server. That is, the DASH client may retrieve the MPD file for use in initiating a live streaming session. Based on the MPD file, and selection of a representation, the DASH client can make several further decisions, including determining what is the latest segment that is available on the server, determining the segment availability start time of the next segment and possibly future segments, determining when to start playback of the segment, and determining when to get/fetch/request a new MPD file.

In some example implementations, the MPD may further include information about DASH events in order to signal aperiodic information to DASH clients or DASH applications. Events may be timed, starting at a specific media presentation time with a duration. Additionally, or alternatively, the event information may include control messages for a media player that are associated with specific times during playback of the media presentation, such as advertisement insertion cues. Media that may be inserted during streaming may be provided from separate servers, such as an advertisement server. In addition to signaling the events by MPD separately from the media representations, events may also be multiplexed in-band in a selected media representation in one or several selected adaptation sets only, or in all representations.

Figure 2:
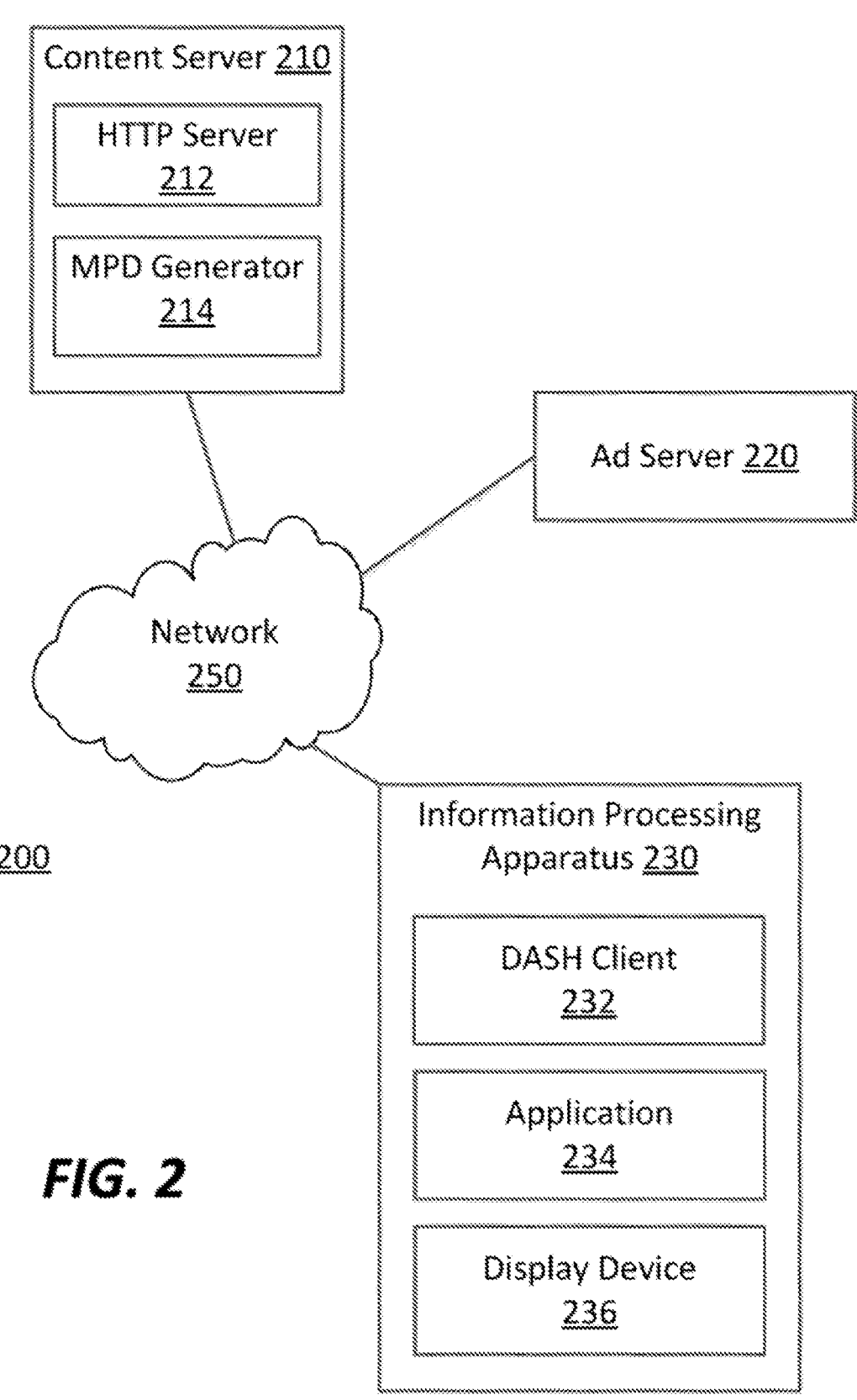
FIG. 2 illustrates a Dynamic Adaptive Streaming over HTTP (DASH) system according to an embodiment of the present disclosure.

An exemplary DASH system 200 is illustrated in FIG. 2. The DASH system 200 may include one or more centralized or distributed content servers 210 and an information processing apparatus 230 which are connected by a network 250. The DASH system (200) may also include one or more supplemental content servers such as one or more advertisement server 220.

The content server 210 may provide primary content (e.g., a main program) and an MPD for the content, to the information processing apparatus 230. The manifest file can be generated by an MPD generator 214. The primary content and the manifest file can be provided by a same sever or different servers.

The information processing apparatus 230 may include a DASH client 232 that directly communicate with the content server 210. The DASH client 232, controlled by a DASH application 234 of the information processing apparatus 230, may request and/or receive the MPD and may request and acquire primary content from an HTTP server 212 of the content server 210 based on the MPD. The MPD may be processed by the DASH client 232. Further, the DASH client 232 may acquire advertisement content from the advertisement server 220, or other content (e.g., interactive content) from one or more supplemental content servers according to DASH events. The main content and the advertisement content can be processed by the DASH client 232 and the DASH application 234 and output for display on a display device 236 of the information processing apparatus 230. The display device 236 may be integrated with, or external to, the information processing apparatus 230. Further, the DASH client 232 may extract other event information from one or more timed metadata tracks and send the extracted event information to the DASH application 234 for further processing. The DASH application 234 may be configured, for example, to display supplemental content based on the event information.

Figure 3:
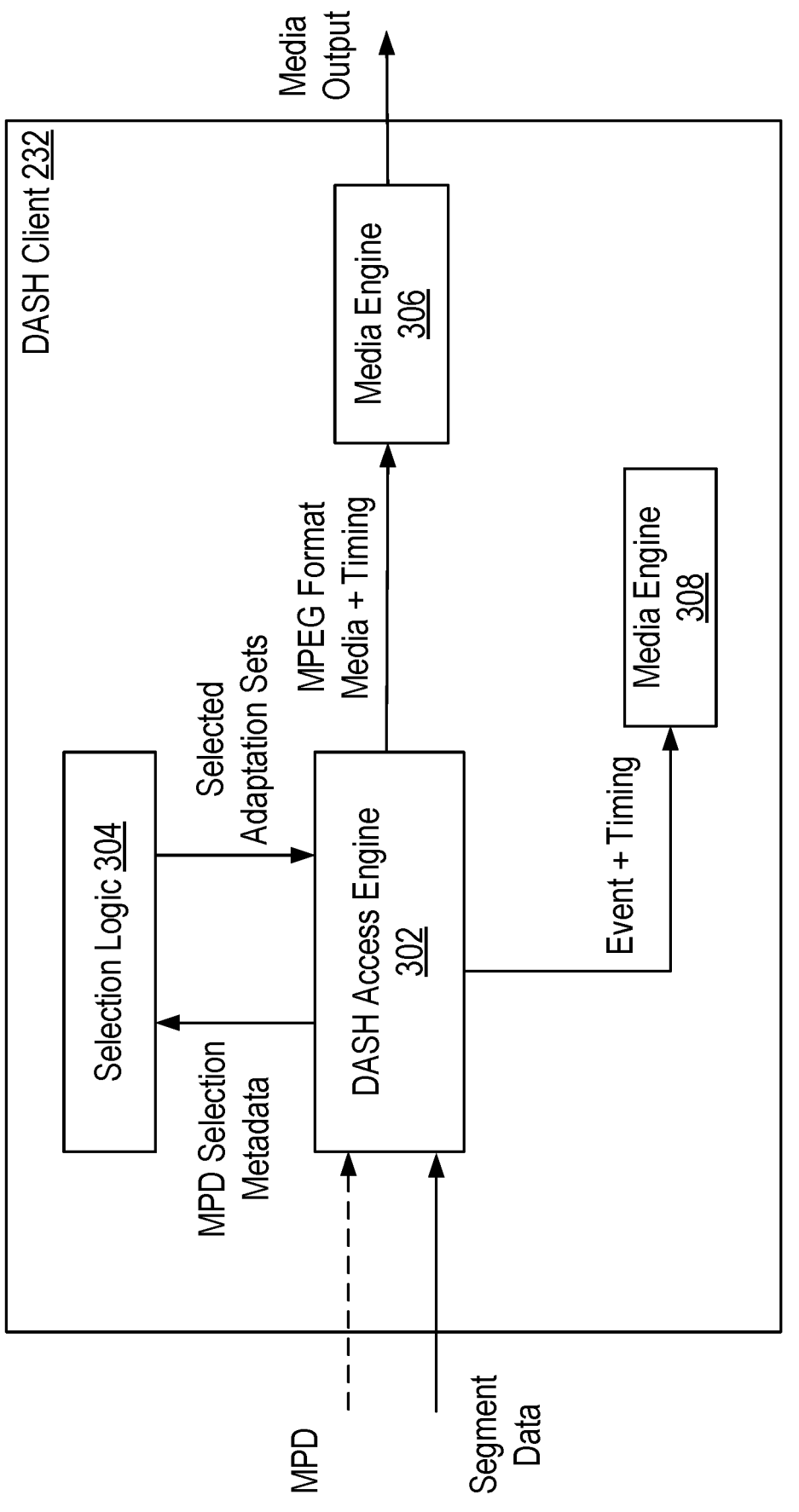
FIG. 3 illustrates a DASH client architecture according to an embodiment of the present disclosure.

An example for the DASH client 232 is illustrated in FIG. 3. As shown in FIG. 3, the example DASH client 232 may include a DASH access engine 304, a selection logic 302, and media engines 306 and 308. The DASH access engine 302, for example, may be configured to communicate with the content server for retrieving a portion of or an entirety of the MPD of the streaming media, and for requesting and retrieving segment data of the dynamically requested streaming media as well as for requesting supplemental media (advertisement) according to MPD DASH events. The selection logic 304 may be configured to determine the next one or more segments to request including selection of adaptation sets and representations. Such decision for example, may be determined by user instructions as well as by other real time information such as the network bandwidth and throughput. The media engines 306 may be configured to process the segment data received by the DASH access engine 302 according to a format of the media segments (e.g., MPEG) and timing of the media segments to generate main media output. The media engine 308 may be configured to process media content associated with timed DASH events from the DASH Access Engine 302 to generate supplemental media output (such as advertisement), which, for example, may be inserted into the main media output.

Media Container Files

Media contents may be stored in files having various predefined formats. A media contain file may be used to define a general structure for files that contain time-based multimedia data such as videos, audios and other data associated with the videos and audios. An ISO base media file format (ISOBMFF) is one example multimedia container files. It was designed as a flexible and extensible format that facilitates interchange, management, editing and presentation of the multimedia. In the disclosure below, while the term "ISOBMFF" refers to a specific container file format, it is also used below to represent any media container file format, to which the underlying principles below apply.

An ISOBMFF may include timing, structure, and media information for timed sequences of media data, such as audio-visual presentations. The file structure is may be designed as object-oriented. An ISOBMFF file, for example, can be decomposed into basic objects in a simple manner. The structure of the objects may be implied and derived from their type as defined.

Files conforming to the ISOBMFF may be formed as a series of object, referred to as "boxes". All data may be contained in boxes. The boxes may be cascaded in a hierarchical manner There may be no other data within the file. A presentation (e.g., a motion sequence) may be contained in several files. All timing and framing information may be included in the ISOBMFF file, and the ancillary files may essentially use any format.

For example, a file type box ("ftyp") may be placed in the beginning of the ISOBMFF file. Within the file type box, general information may be specified including but not limited to type of encoding used, how the data of each encoding is stored, constraints and extensions that are applied to the file, the compatibility, and/or the intended usage of the file. For another example, the file type box may be followed by a movie box which contains cascading boxes therein that defines various tracks of contents.

The ISOBMFF may support streaming of media data over a network as well as local playback. An ISOBMFF file that supports streaming may include information about the data units to stream (e.g., how elementary streaming data in the file should be served over streaming protocols).

In some example implementations, a container file may be used to descript media content corresponding to a particular representation in a streaming manifest. In such implementations, each representation described in a manifest may be associated with a media container file.

Picture-in-Picture

Figure 4:
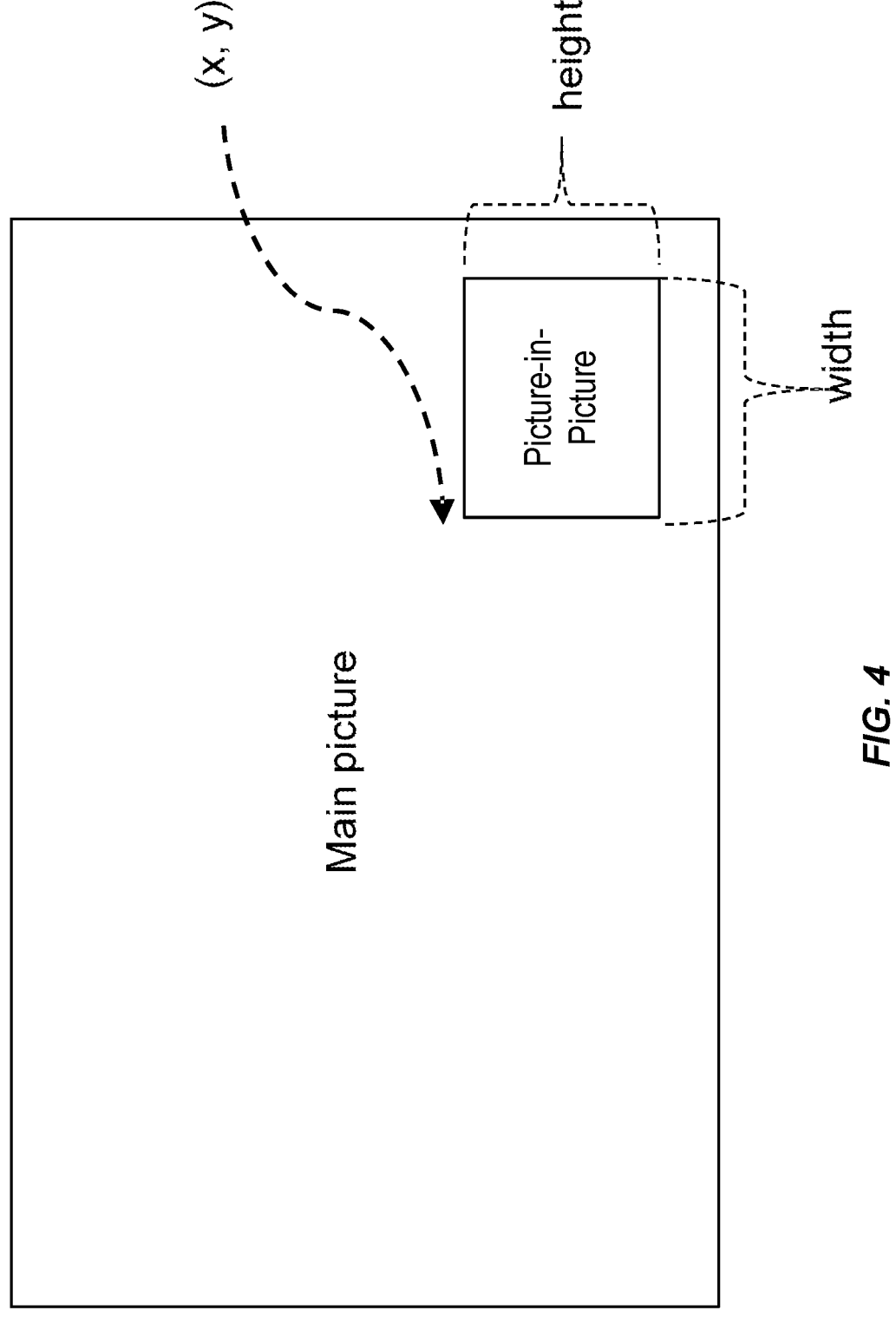
FIG. 4 illustrates an example picture-in-picture application.

In some example implementations, visual media content may be overlaid in a picture-in-picture (PiP) mode. The picture-in-picture use case is illustrated in FIG. 4. As shown in FIG. 4, a PiP view contains a main picture and a PiP. The main picture takes the entire screen while the overlay picture takes a portion of the screen, covering a corresponding area of the main picture. The coordinate of the PiP is indicated by x, y, height, and width, where these parameters define the location (e.g., the upper left corner pixel coordinates) and size of the PiP relative to the main picture coordinate correspondingly.

In the case of streaming media, the main video and the PiP video may be delivered as two separate streams. If they are independent streams, they may be decoded by separate decoders and then are composed together for rendering. In some example implementations, if the video codec supports merging the streams, the PiP video stream may be combined with the main video stream, possibly replacing the streaming that represents the covered area of the main video with the PiP video, and then the single stream may be sent to the decoder for decoding and then rendering.

Thus, in order to provide an efficient PiP processing, various signaling information may be included in the media container file to specify the possible roles and relationships of various media contents in a PiP experience. Such signaling would then be interpreted by a playback device for the intended PiP experience. Likewise, such signaling may also be included in a manifest (e.g., DASH MPD) for streaming in order to indicate to streaming clients various PiP possibilities. The streaming clients would then be able to parse the manifest and determine when and how to use and provide PiP experience to users. Such PiP signaling in a streaming manifest, for example, may be derived from the PiP signaling in the underlying media container file associated with the streaming media.

A general PiP signaling solution should, for example, be capable of indicating how two or more tracks can be used for the PiP experience, i.e. the decoded pictures of the tracks can be overlaid over a region of the decoded pictures of the other track(s). Example information that may be signaled directly or at least may be derived from the signaling may include but is not limited to:

The possible combinations of media contents (e.g., tracks) that can create a PiP experience.

Identification of main and overlaying contents or tracks in a PiP experience.

Indication of location of an overlaying content or track in a PiP experience.

The example implementations below provide a modification/extension of some existing ISOBMFF and DASH manifest framework for supporting PiP signaling that allows for comprehensive and flexible PiP experiences.

For example, the disclosed scheme uses the concept of track groups to defined and signal media tracks that as a group to provide PiP experiences. The example scheme allows for multiple different PiP media track grouping that are uniquely identified. The media tracks in a PiP experience track group may be independently decodable, or may be merged together for decoding. The example scheme correspondingly includes signaling that indicate such merging capabilities within each of the PiP experience track group.

For another example, a picture-in-picture experience may be signaled in streaming manifest. Such signaling may include identifying the adaptation sets with a picture-in-picture descriptor as well as using a role descriptor to identify the PiP experience, and further annotating the subpicture in a manifest where one or more subpictures are identified as one or more regions for substitutions.

Example PiP Signaling in Media Container File

In some example implementations, track preselection groups may be used to specify PiP experience. As shown in 501 of FIG. 5, a medial container file in, for example ISOBMFF, may contain a metadata box, referred to as "moov" in 502 of FIG. 5. The example "moov" box 5020 may contain general information for the media content included in the media container file. The "moov" box may include therein a movie header box, referred to as "mvhd" in 504 of FIG. 5, containing information such as creation and modification time of the presentation associated with the "moov" box.

Figure 5:
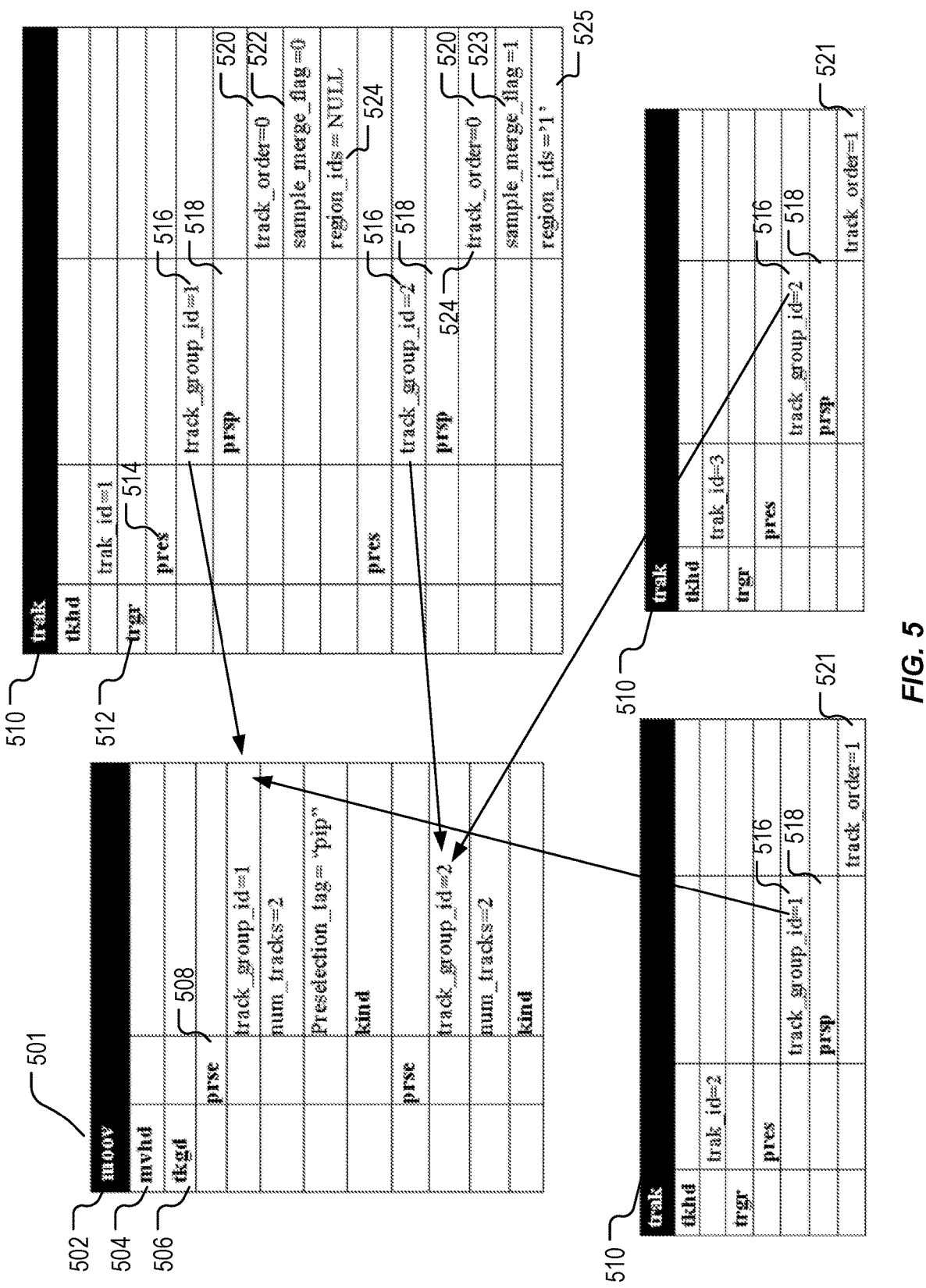
FIG. 5 illustrates an example signaling scheme in a media container file.

The "moov" box 502 may additionally contain a track group description box, referred to as "tkgd" in 506 of FIG. 5. The "tkgd" box may specify under it one or more descriptions of track groups for various media experiences. Specification or description of each of the track groups may be included in a pre-selection track group entry box, referred to as "prse" in 508 of FIG. 5. Each of these preselection groups may be identified as a collection of media tracks that together achieve a certain media experience. In the example of FIG. 5, two track groups are specified, corresponding to the two separate "prse" boxes.

Each of the preselection track group entry "prse" boxes may include a "track_group_id" element for specifying a unique identification of the corresponding preselection group of tracks. The two example track groups specified in FIG. 5 correspond to track_group_id=1 and 2. Each of the preselection track group entry "prse" boxes may also include a "num_tracks" element that specifies a number of tracks in the preselection group of tracks. Each of the "prse" boxes may optionally include one or more "preselection_tag" element, which may be a codec specific value that a playback system can provide to a decoder to uniquely identify one out of several preselections in the media as to the nature of the preselection experience. In the example of FIG. 5, the preselection track group 1 is identified by its "preselection_tag" as being a preselection for PiP experience. The identification of using "a "pip" value for the "preselection tag" element to signal PiP is merely an option. As described below, PiP experience may be signaled using other alternative element in the "prse" box (e.g., in the "kind" box described below). For example, in the example of FIG. 5, the preselection group with "track_group_id"=2 is also a PIP preselection group. There, the indication of PIP may not need to be provided "preselection tag", rather, it may be provided in the "kind" box. In some example implementations, both signaling options may be provided and each of the "prse" box (or each preselection group) may use different options to signal PiP experience.

Each of the preselection track group entry "prse" may further include a "kind" box, which may alternatively be used to specify a role of the corresponding preselection track group. For example, a predefined role scheme may be defined for track group preselections. The predefined role scheme may specify a set of roles for tack group preselections. The "kind" box for a particular preselection group specified by a "prse" may include a data item that indicate one of the predefined roles. For example, a "kind" box may signal the picture in picture experience as one of the predefined roles in which one or more areas of a main picture can be overlaid with one or more substitute pictures. The predefined role scheme, for example, may be specified by the DASH Role schemeIdURI as described in further detail below, and one of the predefined role values may be "pip", for indicating PiP experience. Other alternative role schemes may be used.

Separately in the "moov" box, the various media tracks may each be described by a track box, referred to as "trak" in 510 of FIG. 5. As shown in FIG. 5, a plurality of media tracks may be described/defined in the media container file. Correspondingly, there may be a plurality of "trak" boxes 510 included in the container file. FIG. 5 shows three such examples, identified by their unique identifier trak_id=1, 2, and 3.

Each of the "trak" boxes provides basic information of the corresponding media track. For example, a media track identifier may be specified ("trak_id"). Each of the "trak" boxes may further contain an optional track group box, referred to as "trgr" in 512 of FIG. 5. The track group "trgr" box for each of the media tracks specifies one or more preselection track groups to which the media track belongs. Each of the one or more track groups to which the media track belongs may be specified by one preselection box, referred to as "pres" in 514 of FIG. 5. The track group "trgr" box for a media track thus may include one or more preselection boxes "pres", depending on how many preselection groups (as defined in the "prse" boxes 508 of the "tkgd" box 506 described above) this particular media track is associated with.

Each of the one or more preselection "pres" boxes 514 may identify a corresponding track group by preselection group ID, as shown by 516 of FIG. 5, and, as an example, may further optionally specifies how this particular media track is used in relation to other media tracks in the preselection track group for the corresponding experience via a preselection processing box, referred to as "prsp" in 518 of FIG. 5. The "prsp" box may be optional for a particular group preselection of the track and may be included as needed. For example, in FIG. 5, each of the media tracks with trak_id=1, 2, and 3 may be associated with or belongs to one or both of the two example preselection track groups defined by the two "prse" boxes 508 within the "tkgd" box 506 above, with the "prsp" box included.

An example preselection processing "prsp" box 518 for the media track with trak_id=1 with respect to the particular preselection group with a track_group_id may specify a track order parameter, referred to as "track_order" in 520 or 521 of FIG. 5. The track order parameter may be used to specify a priority order among the media tracks within the preselection group. Lower value for the track order parameter, for example, may indicate higher priority. Particularly for an example PiP preselection group, a track that is a part of the main picture of the PiP experience, may be set at a track_order=0, as shown by 520 for the track with track_id=1. Any other media tracks of the PiP preselection group for the picture in picture experience that are intended to be used as overlays or substitutes of one or more regions of the main picture (referred to as the substitute pictures) may be set at track_order values higher than 0, as shown by 521 for the tracks with track_id=1 and 2. Within the substitute tracks of the preselection group, a lower track_order value indicates the priority of the substitute picture for the media track in relation to other media tracks.

The example preselection processing "prsp" box 518 may further optionally specifies a sample merge flag, referred to as "sample_merge_flag" in 522 and 523 of FIG. 5. The sample merge flag may be specified as a binary value. For example, "sample_merge_flag" with binary value 1 may indicate that this track belongs to a merge track group and is enabled to be mergeable with one or more other tracks in this track group for merged decoding (merge of bit stream of the main and sub picture before decoding). The media tracks in this merge track group may be sorted according to their "track_order" values specified with respect to the preselection group (520 and 521 of FIG. 5) and as described above. A merge group, for example, may include one media track with sample_merge_flag=1, followed by one or more media tracks with sample_merge_flag=0 or with no sample_merge_flag (default to zero in that case). For example, all tracks of a merge group may be of the same media type and may have all samples time-aligned. For a PiP preselection group, the track with sample_merge_flag=1 may be the main picture that other tracks can merge into and then decoded as merged to form a PiP experience, and the media tracks with sample_merge_flag=0 in a group having a main track with sample_merge_flag of 1 may be the substitute pictures.

In the example of FIG. 5, the PiP group with track_group Id=2, has a mergeable main track (with track_id=1 and having its sample_merge_flag=1, as shown by 523), and sub-picture track with track_id=3, which can be merged in the main picture (track_id=1) in this PiP group, but by itself is not mergeable to include other tracks, by not including the sample_merge_flag in its "prsp" box. In this example, if the sample_merge_flag is to be included for track 3 with respect to group 2, it wold be included as having 0 value.

Further in the example of FIG. 5, the PiP group with track_group Id=1, has a non-mergeable main track (with track_id=1 and having its sample_merge_flag=0, as shown by 522. As such, this PiP is not to be merged prior to decoding. Rather, each track would be decoded separately and then merged according to a PiP configuration to form a combined picture after decoding. This PiP group includes track 2 as a sub-picture. It's sample_merge_flag, present or not, would be inconsequential with respect to this PiP group.

For a media track that participates in a PiP preselection group, for example, may further optionally include in its "prsp" box corresponding to the PiP preselection group a list of identifiers for regions, referred to as "region_ids" in 524 and 525 of FIG. 5. The list of region IDs may identify a list of white spaced regions of the coded video data units in this media track that other media tracks in the PiP preselection group can overlay. This field indicates location of regions in the video bitstream prior to decoding for a mergeable track where merges can occur such that decoder can properly assemble merged bitstreams for decoding. A NULL string or absence of "region_ids" may indicate that this no regions of this corresponding media track is replaceable or substitutable in the coded bit stream. As such, the "sample_merge_flat" should be set at 1 (mergeable before decoding) when the "region_ids" is not NULL, and a combination of sample_merge_flag=1 and a non-NULL "region_ids" may thus indicate that the coded data units represented by the "region_ids" of this corresponding track can be replaced by the other tracks with track_order value larger than 0. Further in some example implementations, a media track with a non-NULL "region_ids" should also have "track_order" of 0, indicating the media track as a main picture in the PiP experience.

With the example configuration scheme above, an example method for signaling PiP in a media container file may be constructed. In such an example method:

A preselection track group entry box, e.g., "prse" box, in the container file may be used to defined a track group configured to provide a PiP experience.

A track group identifier, e.g., "track_group_id", may be used within a preselection track group entry box to specify an identifier for the example media track group associated with the example PiP experience.

An integer element, e.g., "Num_tracks", may be included within a preselection track group entry box in a track group definition to indicates a total number of component tracks in a PiP preselection group.

An information box, e.g. "kind" box, may be included within a preselection track group entry box to specify that a role of a preselection group among a predefined set of roles including PiP.

A preselection box, e.g., "pres" box, within a track box, for specifying a media track group and for indicating that the track is a part the group that may be configured for providing PiP experience (a PiP preselections group).

A track group preselection identifier within the preselection box ("pres") of the media track to identify the corresponding track group, which in combination of the definition of the track group in the "prse" box above determines whether the track group is for PiP experience.

A preselection processing box, e.g., 'prsp' box within a preselection box ("pres") of a media track to defines a processing manner of the media track with respect to a PiP experience selection group.

A priority value, e.g., "track_order", as part of the preselection processing box ("prsp") of a media track associated with a PiP preselection group of media tracks to indicate whether this media track is a main picture of the PiP experience (e.g., track_order=0) or substituting picture of the PiP experience (e.g., track_order 1). If the main PiP consists of the multiple tracks, then these multiple tracks would include "prsp" boxes under "pres" boxes with a same track_group_id with track_order being 0.

A merge indication, e.g., "sample_merge_flag", as part of the preselection processing box ("prsp") of a media track associated with a PiP preselection group of media tracks to indicate whether the coded media track in the PiP experience is mergeable by other coded tracks in the group prior to decoding, e.g., sample_merge_flag=1 may indicate that the track is mergeable.

A region list, e.g., "region_ids", as part of the preselection processing box ("prsp") of a media track associated with a PiP preselection group of media tracks to specify a list of identifiers for replaceable regions of the media track for the PiP experience prior to decoding.

Again, merely shown as an example and as an application of the signaling principles described above, the container file of FIG. 5 includes two track preselection groups, group 1 and group 2, three media tracks, track 1, track 2, and track 3. Preselection track group 1 contains media track 1 and track 2, whereas preselection track group 2 contains media track 1 and track 3. Both of the preselection track groups provide a PiP experience, as specified in the "kind" box, by the "preselection_tag" with a value "pip", or both (content of the "kind" boxes is not shown in FIG. 5, but is described above).

For the preselection track group 2 of FIG. 5, a PiP experience is defined with possibility of substituting the subpicture streams of the main PiP picture with the substitute picture stream for decoding. Out of the two media tracks (media track 1 and track 3) for this example PiP experience selection group (track_group_id=2), media track 1 is provided with a "prsp" box to indicate how track 1 is used in the PiP experience in relation to the other media track, media track 3. Specifically, the media track with trak_id=1 forms the main picture (as indicated by its "track_order" of 0). Media track 1 as the main picture is mergeable by content from other media tracks (e.g., media track 3), as indicated by its "sample_merge_flag" set as "1" for media track 1. Further, the region with region ID value of "1" within media track 1 is substitutable with content of media track 3 prior to a single decoding.

For the preselection track group 1 of FIG. 5, a PiP experience is defined with two independent decodings (rather than a single decoding of merged stream), as the sample_merge_flag associated with the main picture track 1 is set to 0.

The following further describes the manner in which syntax for the elements in the PiP signing scheme in a media container file described above may be specified.

Preselection Processing Box Definition:
   Box Type: 'prsp'
   Container: PreselectionGroupBox ("pres")
   Mandatory: No (optional)
   Quantity: Zero or one (present or not present)
   As described above and as an example, this box is within "pres" box, which is within "trgr" box, which is within "trak" box for media tracks, which is within "moov" box. It may contain information about how a track contributing to the preselection can be processed. In some example implementations, media type specific boxes may be used to describe further processing within "prsp". This box is either present or not present in a preselection box within a track.

Preselection Processing Box Syntax

```
aligned(8) class PreselectionProcessingBox
extends FullBox('prsp', version=0, flags ){
unsigned int(8) track_order;
unsigned int(1) sample_merge_flag;
unsigned int(7) reserved;
  utf8string region_ids;
  // further attributes and Boxes defining additional processing of
  // the track contributing to the preselection
}
```

Semantics of the various syntax elements of the preselection processing box is described further below.

Preselection Processing Box Semantics
   "track_order" defines the order of this track relative to other tracks in the preselection group as described below.
   "sample_merge_flag" equal to 1 indicates that this track is enabled to be mergeable with another track prior to decoding.
   "region_ids" specifies a list of white spaced IDs for the coded vide data units that their corresponding substitute streams can be replaced with the other coded tracks in this preselection prior to decoding. A NULL string means that no region is replaceable. For example, this field can have a non-NULL value only if track_order=0. The use of this field for PiP experience is described below above and in further detail below.

For example, for picture in picture applications, every track that is a part of the main picture, shall have its track_order=0. Any track in the picture in picture applications that is intended to be used as an overlay or substitute of one or more regions of the main picture (known as the substitute picture) shall have its track_order to be set with a value higher than 0. A lower track_order value indicates the priority of the substitute picture.

Sample entry specific specifications might require the tracks for a preselection to be provided to the respective decoder instances in a specific order. Since other means, such as the track_id, are not reliable for this purpose, the track_order may be used to order tracks in a preselection relative to each other. A lower number indicates that at a given time the samples of the corresponding track is provided to the decoder before the samples of tracks with higher track order number. If two tracks in a preselection have their track_order set to the same value or if the preselection processing box is absent for at least one of the tracks, the order of these tracks is not relevant for the preselection, and samples can be provided to the decoder in any order.

A merge group may be defined as a group of tracks, sorted according to track_order, where one track with the sample_merge_flag set to 1 is followed by a group of consecutive tracks with the sample_merge_flag set to 0. All tracks of a merge group shall be of the same media type and shall have all samples time-aligned.

If the sample entry type is associated with a codec-specific process to merge samples of a preselection, this process shall be used.

The combination of sample_merge_flag=1 and a not NULL region_ids may indicate that the coded data units represented by the ids in the region_ids can be replaced by the other tracks with track_order value larger than 0. The concrete semantics of the region IDs need to be explicitly specified for specific codecs.

In some example implementations, if the tracks in the merge group are all of sample entry type of "mhm2" (MPEG-H 3D Audio), the merging process may be defined in, for example, ISO/IEC 23008-3:2019, subclause 14.6.

In some example implementations, tracks in a merge group may have different sample entry types.

In some example implementations, if the sample entry type is not associated with a codec-specific process to merge samples of a preselection and when region_ids is NULL, then the following process shall be used: merging within the merge group may proceed by forming tuples of track samples with the same time stamp across contributing tracks. The ordering of samples within the tuple may be determined by track_order. These tuples may be formed by byte-wise concatenation of the samples resulting in a single sample with having the respective time stamp assigned. If generation of new tracks is targeted, each merge group may result in a separate output track conformant to a media type derived from the media types of the merged tracks. For tracks not part of a merge group, a merging process is not particularly or limited by this disclosure Preselection Track Group Entry Box Definitions
   Box Type: 'prse'
   Container: TrackGroupDescriptionBox
   Mandatory: No
   Quantity: Zero or More
   As described above, the "prse" box may be within track preselection group box "tkgd", which is within "moov" box. It may contain information about definition of various preselection track group.

Preselections can be qualified, for example, by language, kind or media specific attributes like audio rendering indications, audio interactivity or channel layouts. Attributes signaled in a preselection track group entry box may take precedence over attributes signaled in contributing tracks.

A preselection track group entry box may be configured to describe only track groups identified by track_group_type equal to 'prse'.

In some example implementations, all preselections with at least one contributing track having the track_in_movie flag set to 1 may be qualified by preselection track group entry boxes. Otherwise, the presence of the preselection track group entry boxes may be optional.

In some example implementations, all attributes uniquely qualifying a preselection shall be present in a preselection track group entry box of the preselection.

Preselection Track Group Entry Box Syntax

```
aligned(8) class PreselectionTrackGroupEntryBox
extends TrackGroupEntryBox('prse', version=0, flags)
{
    unsigned int(8) num_tracks;
    utf8string preselection_tag;
    if (flags & 1) {
        unsigned int(8) selection_priority;
    }
    if (flags & 2) {
        unsigned int(8)   segment_order;
    }
    // Boxes describing the preselection
}
```

Semantics of the various syntax elements of the preselection processing box is described further below.

Preselection Track Group Entry Box Semantics

The preselection track group entry box "prse" may contain information on what experience is available when the corresponding preselection group is selected. Boxes suitable to describe a preselection include but are not limited to the following list of boxes defined herein:

Box that defined audio elements: AudioElementBox

Box that provide audio element selection: AudioElement-SelectionBox

Box that specify extended languages: ExtendedLanguage-Box

Box that specify other user data: UserDataBox

Box that specify preselection type and information: Kind-Box

Box that provides labeling information: LabelBox

Box indicating audio rendering: AudioRenderingIndica-tionBox

Box specifying channel layouts: ChannelLayout

In some example implementations, if a UserDataBox is contained in a preselection track group entry box, then it shall not carry any of the above boxes.

In some example implementations, num_tracks specifies the number of non-alternative tracks grouped by this preselection track group.

In some example implementations, a track grouped by this preselection track group may be a track that has the 'pres' track group with track_group_id equal to the ID of this preselection.

In some example implementations, the number of non-alternative tracks grouped by this preselection track group may be a sum of the following:

the number of tracks that have alternate_group equal to 0 and are grouped by this preselection track group, the number of unique non-zero alternate_group values in all tracks that are grouped by this preselection track group.

In some example implementations, the value of num_tracks may be greater than or equal to the number of non-alternative tracks grouped by this preselection track group in this file. A value equal to 0 may indicate that the number of tracks grouped by this track group is unknown or not essential for processing the track group.

In some example implementations, the value of num_tracks can be greater than the number of non-alternative tracks containing a preselection group box ("pres") with the same track-groupid in this file when the preselection is split into multiple files.

In some example implementations, when a player has access to fewer non-alternative tracks grouped by this preselection track group than indicated by num_tracks, the player might need to omit the tracks grouped by this preselection track group.

In some example implementations, the preselection_tag may be a codec specific value that a playback system can provide to a decoder to uniquely identify one out of several preselections in the media.

In some example implementations, selection_priority may be an integer that declares the priority of the preselection in cases where no other differentiation such as through the media language is possible. A lower number indicates a higher priority.

In some example implementations, segment_order specifies, if present, an order rule of segments that is suggested to be followed for ordering received segments of the Preselection. The following values are specified with semantics according to, as an example, ISO/IEC 23009-1:2022, sub-clause 5.3.11.5:

0: undefined

1: time-ordered

2: fully-ordered

In some example implementations, other values may be reserved. If segment_order is not present, its value shall be inferred to be equal to 0.

In some example implementations, not all tracks contributing to the playout of a preselection may be delivered in the same file.

In some example implementations, and as described above, the kind box might utilize the Role scheme defined in ISO/IEC 23009-1:2022, subclause 5.8.5.5 as it provides a commonly used scheme to describe characteristics of pre-selections.

In some example implementations, the preselection track group entry box may carry information about the initial experience of the preselection in the referenced tracks. The preselection experience can change during the playback of these tracks, e.g., audio language can change during play-back. These changes are not subject to the information presented in the preselection track group entry box.

In some example implementations, further media type specific boxes may be used to describe properties of the preselection. Readers may ignore and skip boxes that are not recognized.

In some example implementations, and as described above, a Kind Box may be used to signal the picture in picture experience, in which one or more areas of a main picture can be overlaid with one or more substitute pictures by using the DASH Role schemeIdURI and the value "pip".

Preselection Track Group Entry Box Design: Advantages

This design above for the preselection track group entry box above may provide several benefits:

Uses the existing preselection track group box for PiP signaling

Allows multiple groups of PiP sharing tracks.

Allows more than 1 substitute picture in a PiP experience.

Allows a main picture consists of several tracks

Allows replacement of the main picture subpictures/regions with the substitute streams for a single decode of all tracks in PiP.

Example PiP Signaling in Streaming Manifest

As described above, in addition to including various signaling information in the media container file to specify the possible roles and relationships of various media contents in a PiP experience, such signaling nay also be included in a manifest (e.g., DASH MPD) for streaming application in order to indicate to streaming clients various PiP possibilities. The streaming clients would then be able to parse the manifest and determine when and how to use and provide PiP experience to users by adaptively constructing its media request to the content server. Such PiP signaling in a streaming manifest, for example, may be derived from the PiP signaling in the underlying media container file associated with the streaming media, as described above. Generally, the media files as container files and the manifest associated with the media may be harmonized at the generation time.

In some example implementations, PiP experience may be provided as additional Roles via an existing Role schemes. Such roles may be signaled in the streaming manifest at various levels. For example, such roles may be signaled at the Adaptation Set level.

In one example implementation, example values of the DASH Role scheme as specified in urn:mpeg:dash:role:2011 may include the following values in order to support PiP signaling in a manifest>

TABLE 1

| Role@value attribute for scheme with a value "urn:mpeg:dash:role:2011" | | |
| --- | --- | --- |
| Role@value | Description | Applicable Media Type(s) |
| caption | Captions (see NOTE 3 below). | video, text |
| subtitle | Subtitles (see NOTE 3 below). | video, text |
| Main | Main media component(s) which is/are intended for presentation if no other information is provided. | any |
| PIP-main | Contain the main component of a picture-in-picture presentation, over part of which another media component is overlaid. | video |
| PIP-sub | Contain the sub-media component that is suitable to be overlaid over the main component in a picture-in-picture presentation. | video |
| alternate | Media content component(s) that is/are an alternative to (a) main media content component(s) of the same media component type (see NOTE 2 below). | any |
| supplementary | Media content component that is supplementary to a media content component of a different media component type (see NOTE 1 below). | any |
| commentary | Experience that contains a commentary (e.g. director's commentary) (typically audio). | audio, text |
| dub | Experience that contains an element that is presented in a different language from the original (e.g. dubbed audio, translated captions). | audio, text |
| description | Textual or audio media component containing a textual description (intended for audio synthesis) or an audio description describing a visual component. | audio, text |
| sign | Visual media component representing a sign-language interpretation of an audio component. | video |
| metadata | Media component containing information intended to be processed by application specific elements. | text, application |
| enhanced-audio-intelligibility | Experience containing an element for improved intelligibility of the dialogue. | audio |
| emergency | Experience that provides information, about a current emergency, that is intended to enable the protection of life, health, safety, and property, and may also include critical details regarding the emergency and how to respond to the emergency. | any |
| forced-subtitle | Textual information meant for display when no other text representation is selected. It is used to clarify dialogue, alternate languages, texted graphics or location/person IDs that are not otherwise covered in the dubbed/localized audio. | text |
| easyreader | Simplified or reduced captions as specified in [United States Code Title 47 CFR 79.103(c)(9)]. | text, video |

TABLE 1-continued

Role@value attribute for scheme with a value "urn:mpeg:dash:role:2011"

| Role@value | Description | Applicable Media Type(s) |
|---|---|---|
| karaoke | Textual representation of a songs' lyrics, usually in the same language as the associated song. See SMPTE ST 2067-2. | any |

NOTE 1
A normal audio/video program labels both the primary audio and video as "main". However, when the two media component types are not equally important, for example (a) video providing a pleasant visual experience to accompany a music track that is the primary content or (b) ambient audio accompanying a video showing a live scene such as a sports event, that is the primary content, the accompanying media can be assigned a "supplementary" role.
NOTE 2
Alternate media content components are expected to carry other descriptors to indicate in what way it differs from the main media content components (e.g. a Viewpoint descriptor or a Role descriptor), especially when multiple alternate media content components including multiple supplementary media content components are available.
NOTE 3
Open ("burned in") captions or subtitles would be marked as media type component "video" only, but having a descriptor saying "caption" or "subtitle".
NOTE 4
Role descriptors with values such as "subtitle", "caption", "description", "sign" or "metadata" can be used to enable assignment of a "kind" value in W3C HTML 5 applications for tracks exposed from a DASH MPD.

The values "PIP-main" and "PIP-sub" are particular included for the signaling of the PiP related information in a streaming manifest (e.g., a DASH MPD). As such, at the adaptation level, a Role @value specified as "PIP-main" for an adaptation set in the MPD would signal to a streaming client that the corresponding adaptation set may be part of PiP experience as providing the main picture of the PiP experience, whereas a Role@value specified as "PIP-sub" for an adaptation set in the MPD would signal to a streaming client that the corresponding adaptation set may be part of PiP experience as providing the a substitute picture of a main picture in the PiP experience.

For example, such role value in a role scheme may be included in a picture-picture descriptor in the streaming manifest for signaling PIP contents and their configurations. Such PiP descriptors may be specified at various levels. For example, such PiP descriptors may be specified at the adaptation set level in the streaming manifest.

For example, a SupplementalProperty element in an adaptation set may include the @schemeIdUri attribute equal to a predefined urn specifying the role scheme above including the PiP values.

At the example adaptation set level, adaptation sets signaled with the same descriptor and identical @id for the SupplementalProperty descriptor are considered as being intended to be used in one PiP experience. As described above, a PiP experience may consist of one or more main presentations. Any Adaptation Set for each main presentation may be annotated with a role descriptor with @value='pip-main'. A PiP experience may also include one or more substitute presentations, among which one or more may be overlaid on top of one of the main presentations. Any adaptation set for each substitute presentation may be annotated with a role descriptor with @value='pip-sub' in the SupplementalProperty descriptor.

In some example implementations, an adaptation set may include more than one PiP descriptor, with different @id to express more than one PiP experience. In other words, an adaptation set may be part of multiple different PiP experiences identified by different PiP descriptors within the adaptation set having different @id values. The same adaptation set may be a main picture in some of the multiple PiP experiences (and thus with @value of "pip-main" for the descriptors of the corresponding @id value) but may be a sub picture in some other ones of the multiple PiP experiences (and thus with @value of "pip-sub").

Specifically, an example manifest main include the following:

```
AdaptationSet {
    AdaptationSet-id =1
    SupplementalProperty {
        @id=1
        @value = "pip-main"
        ...
    }
    SupplementalProperty {
        @id=2
        @value = "pip-main"
        ...
    }
    SupplementalProperty {
        @id=3
        @value = "pip-sub"
        ...
    }
}
AdaptationSet {
    AdaptationSet-id=2
    SupplementalProperty {
        @id=1
        @value = "pip-sub"
        ...
    }
    SupplementalProperty {
        @id=3
        @value = "pip-main"
        ...
    }
}
AdaptationSet {
    AdaptationSet-id=3
    SupplementalProperty {
        @id=1
        @value = "pip-sub"
        ...
    }
    SupplementalProperty {
        @id=2
        @value = "pip-sub"
        ...
    }
}
```

In this example, there are three SupplementalProperty IDs: 1, 2, and 3, each representing a PiP experience. For the first PiP experience with SupplementalProperty ID of 1, Adaptation set 1 is the main pictures, whereas adaptation sets 2 and 3 is a sub picture. For the second PiP experience with SupplementalProperty ID of 2, Adaptation set 1 is the main picture, whereas adaptation set 3 is a sub picture. For the third PiP experience with SupplementalProperty ID of 3, Adaptation set 2 is the main pictures, whereas adaptation set 1 is a sub picture.

The descriptors above may be used at levels other than the adaptation set level. These descriptors provide a flexible manner in signaling any arbitrary combination of the various adaptation sets into PiP experiences. An adaptation set can be used in multiple PIP experience, they can be main or sub In some example implementations, the ContentComponent@id may be used to identify the region id for this content component and might be set equal to a region id identified in other schemes such as container file format as described above.

Various example fields of the ContentComponent are shown in Table 2 below.

TABLE 2

Semantics of ContentComponent element used for VVC subpicture annotation

| Element or Attribute Name | Use | Description |
|---|---|---|
| ContentComponent | | Description of a content component. |
| @id | O | The id of the component, i.e. identical to region id. |
| @contentType | O | video |
| @tag | O | White space-separated list of subpicture ids that are included in this content component and suitable for replacement with the picture-in-picture. |
| Role | 0 . . . N | The value indicates the application suitability of the subpicture.<br>For instance, the value "sign" for a subpicture shows it is suitable to be replaced with a signed language video. |

Key

For attributes: M = mandatory, O = optional, OD = optional with default value, CM = conditionally mandatory, F = fixed
For elements: <minOccurs> . . . <maxOccurs> (N = unbounded)
Elements are bold; attributes are non-bold and preceded with an @; list of elements and attributes is in italics bold referring to those taken from the Base type that has been extended by this type.

pictures. Each PiP experience may have a main adaptation set and one or more sub adaptation sets. PiP experiences are identified by the @id of the SupplementalProperty descriptors.

In some further example implementations, a "Content-Component" element may be defined and used to describe the properties of various subpictures of a coded stream to replace portion of the main picture.

Specifically, an Adaptation Set of as PiP main presentation may use one ContentComponent element to identify the content component part of the coded main presentation which is intended to be replaced by one or more PIP substitute presentations. As such, a ContentComponent@tag may contain information for the decoder for the substitution process. For instance, the ContentComponent may indicate the coded video data units representing the target PiP region in the main video to be replaced with the corresponding coded video data units of the PiP video before sending it to the video decoder. In such a manner, coded streams of the PiP can be merged before a single decoding and separate decoding of the main video and the PiP video can be avoided. For a particular picture in the main video, the corresponding video data units of the PiP video may be all the coded video data units in the decoding-time-synchronized sample in the supplemental video Representation. In some example implementations, the format and semantics of ContentComponent@tag may be defined by the corresponding coded video specification.

For a specific example coded video specification, the sub-pictures for PiP may be identified with subpictures id. The following example syntax for ContentComponent@tag may be used:

subpic1 subpic2 . . .

Where: Subpic1, subpic2, and are space-separated sub-picture ids of regions of the coded video bitstream, each defining one subpicture and the group defining the overall region that can be used for the picture in picture overlay.

The example ConentComponent element above can be specified in the adaptation set or representation, annotating that subpicture. A streaming client (e.g., a DASH client) can provide the annotation to a bitstream manipulator to replace the desired subpicture stream with the picture-in-picture video stream prior to decoding and then feed the manipulated bitstream to an appropriate decoder.

FIG. 6 shows an example data and logic flow 600 for PiP signaling in media container files. In step 602, a media container file constructed in an ISO Base Media File Format (ISOBMFF) is received. the media container file includes a main media track and at least one sub media track to be presented in a PiP mode In step 604, the media container file is parsed to identify a media track group for a Picture-in-Picture (PiP) experience via a preselection track group entry (Prse) box syntax element for media track group definition. In step 606, the media container file is further parsed to identify the main media track and the at least one sub media track belonging to the media track group via a preselection group (Pres) box syntax element within a plurality of media track definitions in the media container file. In step 608, the media container file is further parsed to determine a merge mode indicating whether coded data units of the sub media track are to be merged with coded data units of the main media track prior to being decoded depending on presence or value of syntax elements of a sample flag merge syntax element within components of the Pres box element of the main media track or the at least one sub media track. In step 610, the main media track and the at least one sub media track are decoded in the PiP mode according to the merging mode.

FIG. 7 shows another example data and logic flow 700 for PiP signaling in streaming media manifest. In step 702, a streaming media manifest from a streaming server is received. In step 704, the streaming media manifest is parsed to identify a set of PiP signaling information items associated with a set of streaming media contents. In step 706, an adaptive request is constructed for the set of streaming media contents according to the PiP signaling information items. In step 708, the set of streaming media contents is received. In step 710, the set of streaming media contents are decoded and displayed according to the PiP signaling information items.

The techniques described above, can be implemented as computer software using computer-readable instructions and physically stored in one or more computer-readable media. For example, FIG. 8 shows a computer system (800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
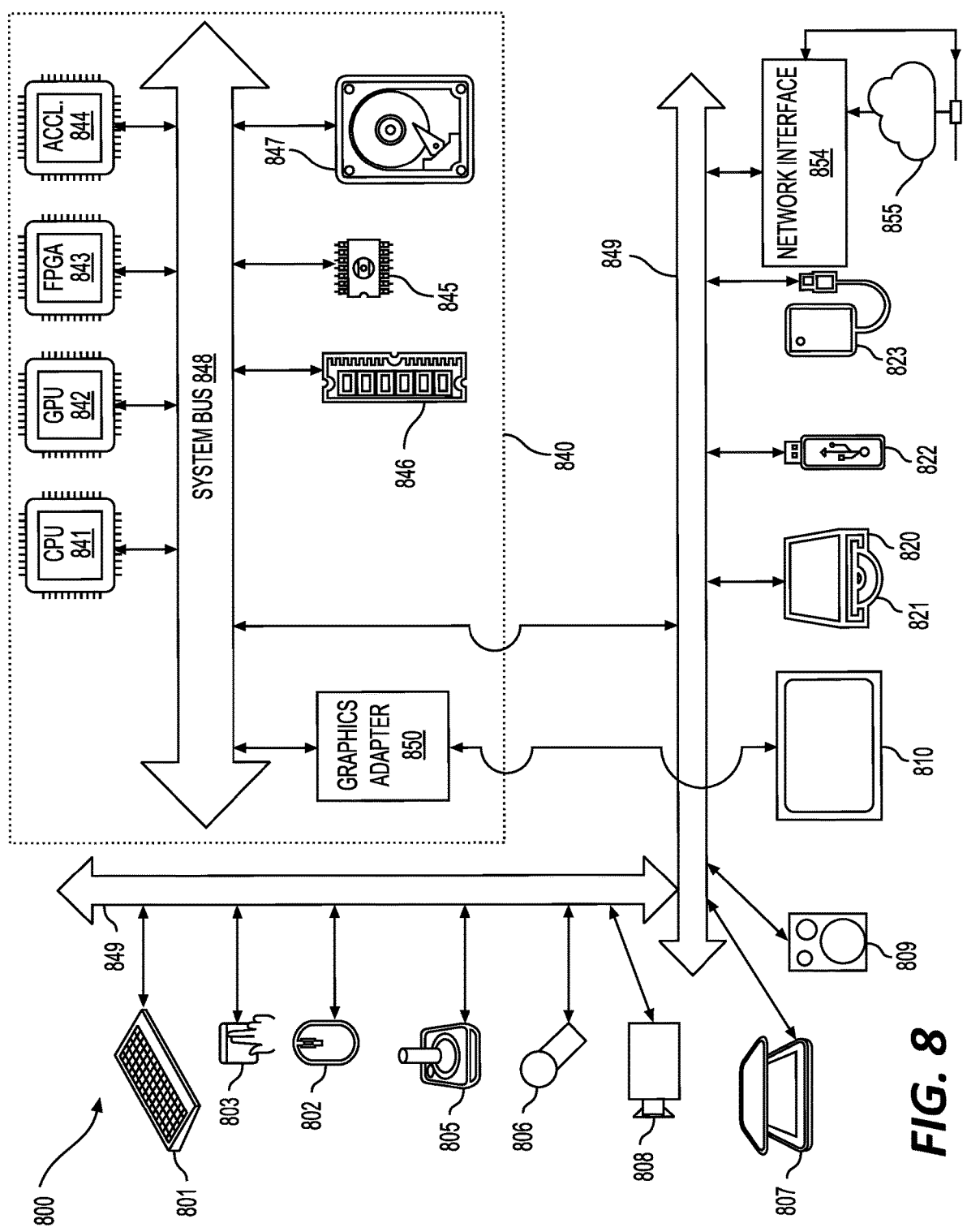
FIG. 8 shows a schematic of a computer system in accordance with example embodiments of the disclosure.

The components shown in FIG. 8 for computer system (800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (not shown), or joystick (805), but there can also be tactile feedback devices that do not serve as input devices), audio output devices (such as: speakers (809), headphones (not depicted)), visual output devices (such as screens (810) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include an interface (854) to one or more communication networks (855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (849) (such as, for example USB ports of the computer system (800)); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), graphics adapters (850), and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). In an example, the screen (810) can be connected to the graphics adapter (850). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846).

Transitional data can also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition to or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method to obtain (Picture-in-Picture) PiP information, comprising:

retrieving a media container file constructed in an ISO Base Media File Format (ISOBMFF), wherein the media container file includes a main media track and at least one sub media track to be presented in a PiP mode;

parsing the media container file to identify a media track group for a PiP experience via a preselection track group entry (Prse) box syntax element for media track group definition;

parsing the media container file to identify the main media track and at least one sub media track belonging to the media track group via a preselection group (Pres)

box syntax element within a plurality of media track definitions in the media container file;

parsing the media container file to determine a merge mode indicating whether coded data units of the at least one sub media track are to be merged with coded data units of the main media track prior to being decoded depending on presence or value of a sample flag merge syntax element within components of the Pres box syntax element of the main media track or the at least one sub media track;

parsing the media container file to determine a region information for PiP, wherein non-null region information for PiP is only extractable from a media track having a highest priority level among media tracks of the media track group; and decoding the main media track and the at least one sub media track in the PiP mode according to the merging mode and the region information.

2. The method of claim 1, wherein the Prse box syntax element belongs to a first predefined type of syntax elements in the media container file configured to define media track groups.

3. The method of claim 2, wherein:

the first predefined type of syntax element each includes a media track group type tag element; and the media track group type tag element indicates an intended experience of the corresponding media track group, including the PiP experience, using a set of predefined purpose keywords.

4. The method of claim 2, wherein:

the first predefined type of syntax elements each includes a media track group type descriptor; and the media track group type descriptor is configured to specify an intended experience of the corresponding media track group, including the PiP experience, using a role scheme with predefined roles.

5. The method of claim 2, wherein each of the first predefined type of syntax elements in the media container file include a number of tracks of the corresponding media track group.

6. The method of claim 1, wherein the Pres box syntax element belongs to a second predefined type of syntax elements within a definition of a media track configured to specify an association of the media track with a media track group using a corresponding media track group identifier.

7. The method of claim 6, wherein each of the second predefined type of syntax elements comprises a media track group processing descriptor (prsp) for specifying PiP processing of the media track with respect to the media track group.

8. The method of claim 7, wherein the media track group processing descriptor comprises a priority parameter to indicated a priority order of the media track relative to other media tracks in the media track group.

9. The method of claim 8, wherein the priority parameter of the main media track of the PiP experience comprises a highest priority value for PiP processing.

10. The method of claim 9, wherein the priority parameter of the at least one sub media track of the PiP experience comprises a lower priority value for PIP processing.

11. The method of claim 8, wherein the sample flag merge syntax element belongs to a third predefined type of syntax elements which are correspondingly included in the media track group processing descriptor associated with main media tracks.

12. The method of claim 11, wherein the third predefined type of syntax element associated with the main media track having a predefined value indicates that the main media track is mergeable with the sub media track prior to being decoded.

13. The method of claim 12, wherein when the third predefined type of syntax element associated with the main media track is of the predefined value, decoding the main media track and the at least one sub media track in the PiP mode comprises merging the coded data units of the main media track and the coded data units of the at least one sub media track for a single decoding.

14. The method of claim 12, wherein the media track group processing descriptor comprises a region identification parameter for indicating a list of regions, in coded stream of corresponding media track, that are to be merged with coded stream of other media tracks prior to decoding.

15. The method of claim 14, wherein when the third predefined type of syntax element associated with the main media track is of the predefined value, the region identification parameter associated with the main media track is non-NULL.

16. The method of claim 14, wherein when the priority order of the media track is not the highest, the region identification parameter for the media track is ignored even if present.

17. The method of claim 14, wherein when the region identification parameter for the media track is non-NULL, the priority order of the media track is correspondingly the highest.

18. The method of claim 1, where either the main media track and the at least one sub media track belongs to another media track group as indicated by another Prse box syntax element in the media container file.

19. A media processing device, comprising a memory for storing instructions and a processor for executing the instructions to:

generate a media container file constructed in an ISO Base Media File Format (ISOBMFF), wherein the media container file includes a main media track and at least one sub media track to be presented in a PiP mode;

include in the media container file a preselection track group entry (Prse) box syntax element for media track group definition to identify a media track group for a Picture-in-Picture (PiP) experience;

include syntax elements of a preselection group (Pres) box syntax element within a plurality of media track definitions in the media container file to identify the main media track and at least one sub media track belonging to the media track group;

include a sample flag merge syntax element within components of the Pres box syntax element of the main media track or the at least one sub media track with a presence of value representing a merge mode indicating whether coded data units of the at least one sub media track are to be merged with coded data units of the main media track prior to being decoded; and include a non-null region information for PiP only in a media track having a highest priority level among media tracks of the media track group.

20. A non-transitory computer-readable storage medium storing a media bitstream that is generated by a media processing method, the media processing method comprising:

generating a preselection track group entry (Prse) box syntax element in the media bitstream for media track group definition to identify a media track group for a Picture-in-Picture (PiP) experience;

generating syntax elements of a preselection group (Pres) box syntax element within a plurality of media track definitions in the media bitstream to identify a main media track and at least one sub media track belonging to the media track group;

generating a sample flag merge syntax element within components of the Pres box syntax element of the main media track or the at least one sub media track with a presence of value representing a merge mode indicating whether coded data units of the at least one sub media track are to be merged with coded data units of the main media track prior to being decoded; and including a non-null region information for PiP in the media bitstream only in a media track having a highest priority level among media tracks of the media track group.

* * * * *